United States Patent [19]

Lu

[11] Patent Number: 5,713,633
[45] Date of Patent: Feb. 3, 1998

[54] BACKREST ASSEMBLY WITH CHAMBER FOR ARTICLES

[76] Inventor: Kuo-Ching Lu, 7F, 539 Mint Shui Rd., Taipei, Taiwan

[21] Appl. No.: 679,788

[22] Filed: Jul. 15, 1996

[51] Int. Cl.⁶ ................... B60N 2/02; B60N 2/48
[52] U.S. Cl. ............. 297/364; 297/408; 297/188.04; 297/217.3; 403/93
[58] Field of Search ................... 297/408, 391, 297/363–365, 188.07, 188.04, 284.1, 284.3, 217.3, 217.4, 405; 403/92, 93, 96

[56] References Cited

U.S. PATENT DOCUMENTS

| | | | |
|---|---|---|---|
| 2,501,581 | 3/1950 | Rieger | 403/96 |
| 3,449,011 | 6/1969 | Edwards et al. | 297/391 |
| 3,512,605 | 5/1970 | McCorkle | 297/391 |
| 3,731,342 | 5/1973 | Cousin | 297/365 |
| 4,266,760 | 5/1981 | Matsui et al. | 297/408 |
| 4,626,028 | 12/1986 | Hatsutta et al. | 297/284.1 |
| 5,120,109 | 6/1992 | Rangoni | 297/284.3 |
| 5,143,468 | 9/1992 | Pausch | 403/92 |
| 5,265,969 | 11/1993 | Chuang | 403/93 |
| 5,267,775 | 12/1993 | Nguyen | 297/217.3 |
| 5,492,257 | 2/1996 | Demick | 297/188.04 |
| 5,507,556 | 4/1996 | Dixon | 297/188.04 |
| 5,529,376 | 6/1996 | Jovan et al. | 297/188.07 |

*Primary Examiner*—Peter M. Cuomo
*Assistant Examiner*—Anthony D. Barfield
*Attorney, Agent, or Firm*—Beveridge, DeGrandi, Weilacher & Young, LLP

[57] ABSTRACT

A backrest assembly having chambers for articles is configured with a U-shape main frame. The top of the main frame has a connecting bracket. The connecting mechanism is adjustably connected with a spacing block with a spring biased steel ball, a recess and a spring biased latch. The spacing block is connected to a top plate with a spring biased steel ball, a recess and a spring biased latch. The main frame is also attached with a backrest which has a chamber at the rear side as well. By this provision, the main frame can be directly or removably attached to the seat of the car. A TV set can be disposed with the chamber of the pillow and a video, game, or karaoke can be installed within the chamber of the backrest. The position of the pillow and the backrest can be readily adjusted to a desired position by the adjustable connection according to different requirements. By the entertainment provided by the above mentioned equipment, boredom of passengers can be reduced during long-distance travel to the lowest level and the relationship among the family can be increased.

4 Claims, 11 Drawing Sheets

5,713,633

BACKREST ASSEMBLY WITH CHAMBER FOR ARTICLES

BACKGROUND OF THE INVENTION

This invention relates to a backrest and, more particularly, to a backrest assembly with chambers for articles, such as a TV set, game set, audio set, etc., to provide entertainment for the customers at the rear seat of the car. The backrest generally configures with a U-shape frame. The top of the frame has a connecting bracket. An spacing block is connected to the bracket by an articulating means. A top plate is rotably disposed at the spacing block. The sides of the frame are provided with an articulating means. A back is installed within the frame.

As our living standard and quality is increased with the economic growth, the automobile has become an indispensable tool in traveling. Especially when family income is increased, almost every family has its own private car. On the other hand, there are a plurality of business cars in the city, especially for the taxi and in light of this, almost everyday we may encounter a traffic jam or congestion during work hours. From this viewpoint, we may understand that the vehicle has played an great role in our transportation.

Not only will the vehicle serve as a transporting tool, but it also will provide entertainment for the driver and the passengers during traveling. For example, the built-in audio sets and the air conditioning can provide a comfortable environment within the car, especially when the driver is trapped within a traffic jam. Then these entertainment become more and more important since the music or broadcasting can calm down a trembling temper. On the other hand, during long distance traveling, a driver or a passenger may feel boredom when there is only broadcasting and music. Accordingly, some driver, especially for the taxi driver, will install a mini-TV at the right side of the instrument panel. Then the driver may enjoy the shows from a TV station. Even the driver can enjoy the shows, but the driving safety, both to the driver and others, is seriously jeopardized. On the other hand, when the TV set is installed at the front side, the passenger who sits in the rear seat can not enjoy it because there is a seat disposed therebetween. Furthermore, only a TV set is not enough to provide complete entertainment.

SUMMARY OF THE INVENTION

It is the object of this invention to provide a backrest with a chamber for articles wherein a plurality of entertainment devices can be incorporated with the chamber to provide a complete range of entertainment.

It is still the object of this invention to provide a backrest with chamber for articles wherein the backrest and the headrest can be readily adjusted to a position which is convenient for the passenger to enjoy the entertainment.

It is yet another object of this invention wherein the TV set, video set, game, and kalaoke etc. can be incorporated with said chamber for providing a complete range of entertainment.

Figure 1:
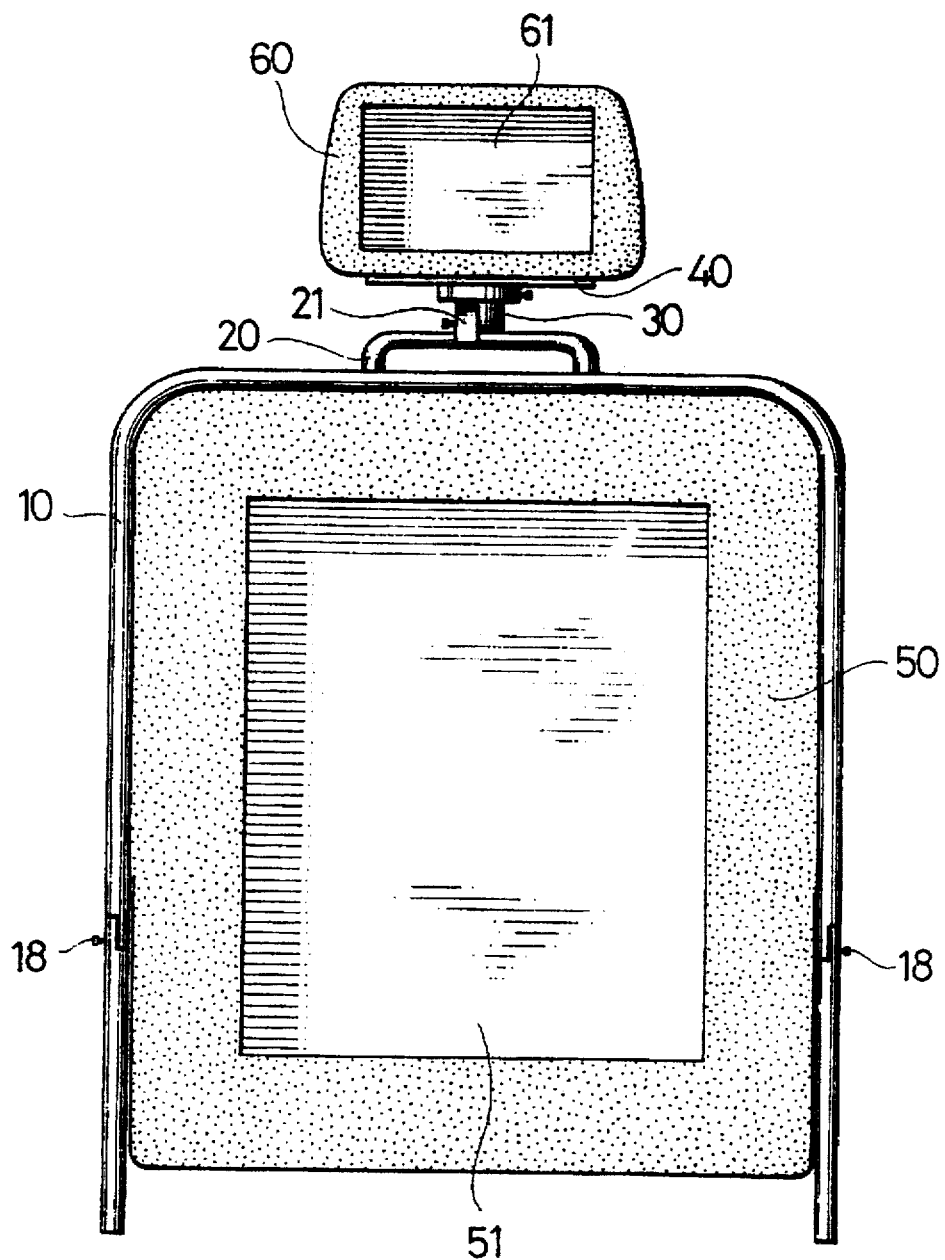
FIG. 1 is a sketch view of the backrest made according to the present invention.
Figure 2:
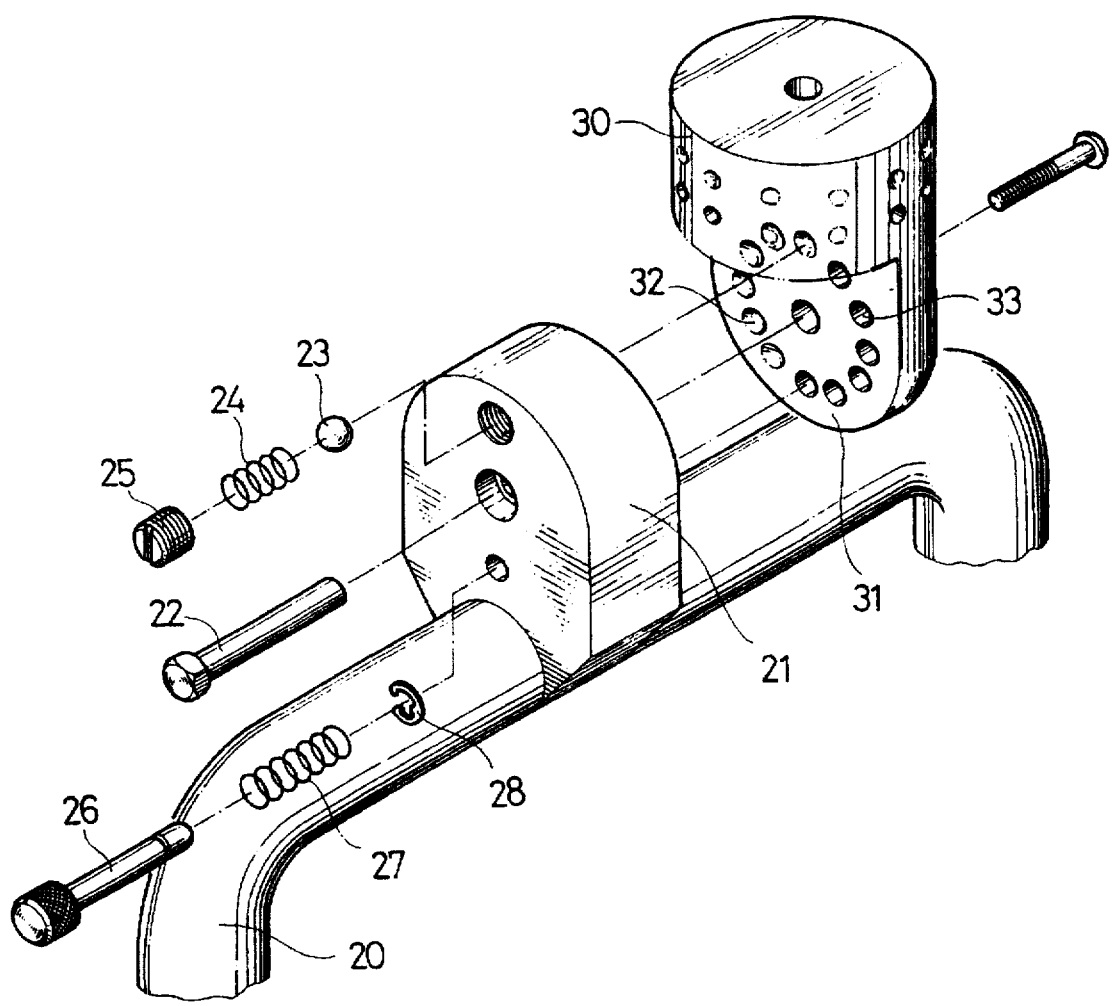
FIG. 2 is an exploded perspective view showing the articulating means and the connecting bracket.
Figure 3:
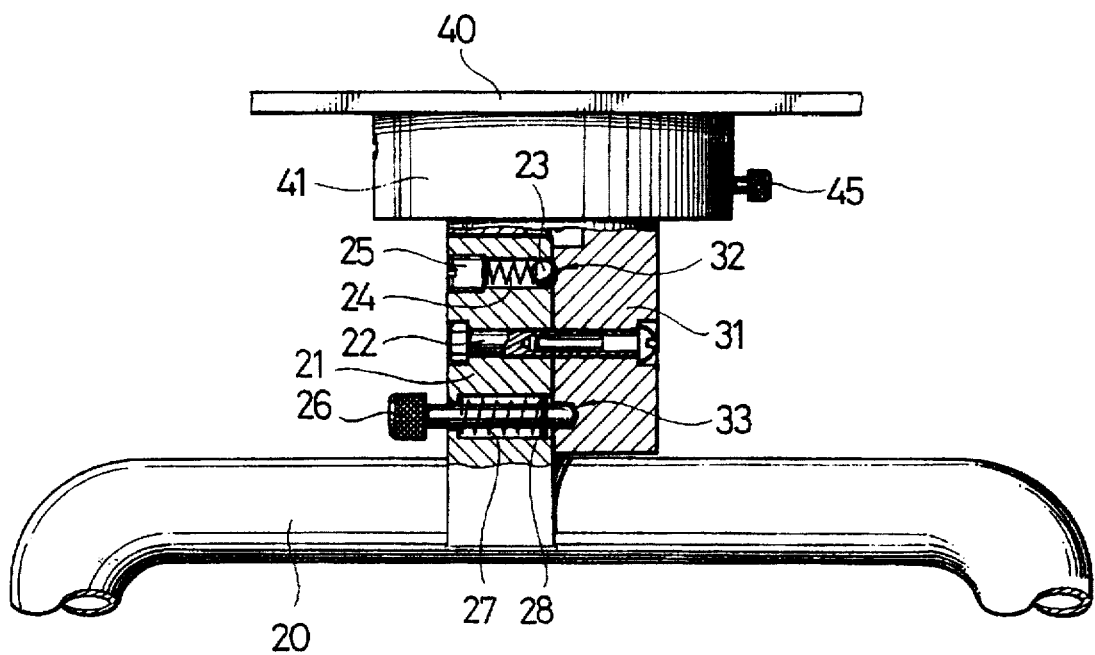
FIG. 3 is a cross sectional view of the articulating means and the connecting bracket when assembled.

| Description of the Reference | |
|---|---|
| 10 | main frame |
| 11 | pivoting seat |
| 110 | slot |
| 12 | pivoting seat |
| 13 | traverse shaft |
| 14 | circular recess |
| 15 | retaining recess |
| 16 | steel ball |
| 17 | spring |
| 171 | bolt |
| 18 | latch |
| 181 | stopping plate |
| 19 | spring |
| 20 | connecting bracket |
| 21 | pivoting seat |
| 22 | traverse shaft |
| 23 | steel ball |
| 24 | spring |
| 25 | bolt |
| 26 | latch |
| 27 | spring |
| 28 | stopping plate |
| 30 | spacing block |
| 31 | pivoting seat |
| 32 | circular recess |
| 33 | retaining recess |
| 34 | circular recess |
| 35 | retaining recess |
| 40 | top plate |
| 41 | shaft seat |
| 42 | steel ball |
| 43 | spring |
| 44 | bolt |
| 45 | latch |
| 46 | spring |
| 47 | stopping plate |
| 48 | longitudinal shaft |
| 50 | backrest |
| 51 | chamber |
| 60 | pillow |
| 61 | chamber |
| 62 | shaft seat |
| 63 | steel bead |
| 64 | spring |
| 65 | bolt |
| 66 | latch |
| 67 | spring |
| 68 | stopping plate |
| 70 | sleeve |
| 71 | bolt |
| 72 | TV set |
| 73 | game set |
| 74 | connector |
| 80 | bracket |
| 81 | shaft |

-continued

| | Description of the Reference |
|---|---|
| 82 | circular recess |
| 83 | retaining recess |

DETAILED DESCRIPTION OF PREFERABLE EMBODIMENT

Referring to FIGS. 1 to 7, the backrest having chamber for articles made according to this invention generally comprises an U-shape main frame 10. A connecting bracket 20 is disposed atop of said main frame 10. A spacing block 30 is connected with said connecting bracket 20 by an articulating means. The top of said spacing block 30 is connected with a top plate 40 by a rotating means. On the other hand, said main frame 10 is also provided with articulating means for traverse connection. The connection between said connecting bracket 20 and said spacing block 30 is clearly disclosed in FIGS. 2 and 3.

A pivoting seat 21 is disposed atop of said connecting bracket 20 eccentrically. The spacing block 30 is also provided with a pivoting seat 31 with respect to said pivoting seat 21. By the combination of said pivoting seats 21, 31 and by means of a traverse shaft 22 passing therethrough. Besides, on the top of said pivoting seat 31 of said spacing block 30, a plurality of circular recesses 32 are disposed with the first 180 degrees sector. The second 180 degrees sector of said spacing block 30 is provided with a plurality of retaining recesses 33 symmetrically to said circular recesses 32. The pivoting seat 21 of said connecting bracket 20 with respect to the first circular recess 32 of the pivoting seat 31 of said spacing block 30 is provided with a through hole having a steel ball 23, a spring 24 and a bolt 25 therein. By the biasing force provided by said spring 24, the steel ball 23 is projected into the circular recess 32. On the other hand, the pivoting seat 21 of said connecting bracket 20 with respect to the first retaining recess 33 of the pivoting seat 31 of the spacing block 30 is provided with a through hole having a latch 26 and a spring 27 therein. By the biasing force provided by said spring 27, the tip of the latch 26 is moved by the help of the stopping plate 28 which is pressed by the spring 27 into the retaining recess 33. The rear end of the latch 26 is normally projected above the back side of the pivoting seat 21 for readily handling. This articulating means can be released as the latch 26 is pull backward. When the latch 26 is remained in released position, the spacing block 30 can rotate through 180 degrees with respect to the connecting bracket 20 and can be positioned at any desired angle. During the rotation/adjustment, the steel ball 23 is slipped within the circular recesses 32. When the desired position is reached, the latch 26 is also aligned with a corresponding retaining recess 33, then the latch 26 can be resumed to its locked position as the latch 26 is moved in again by the spring 27. As a result, the desired angle is attained.

Figure 4:
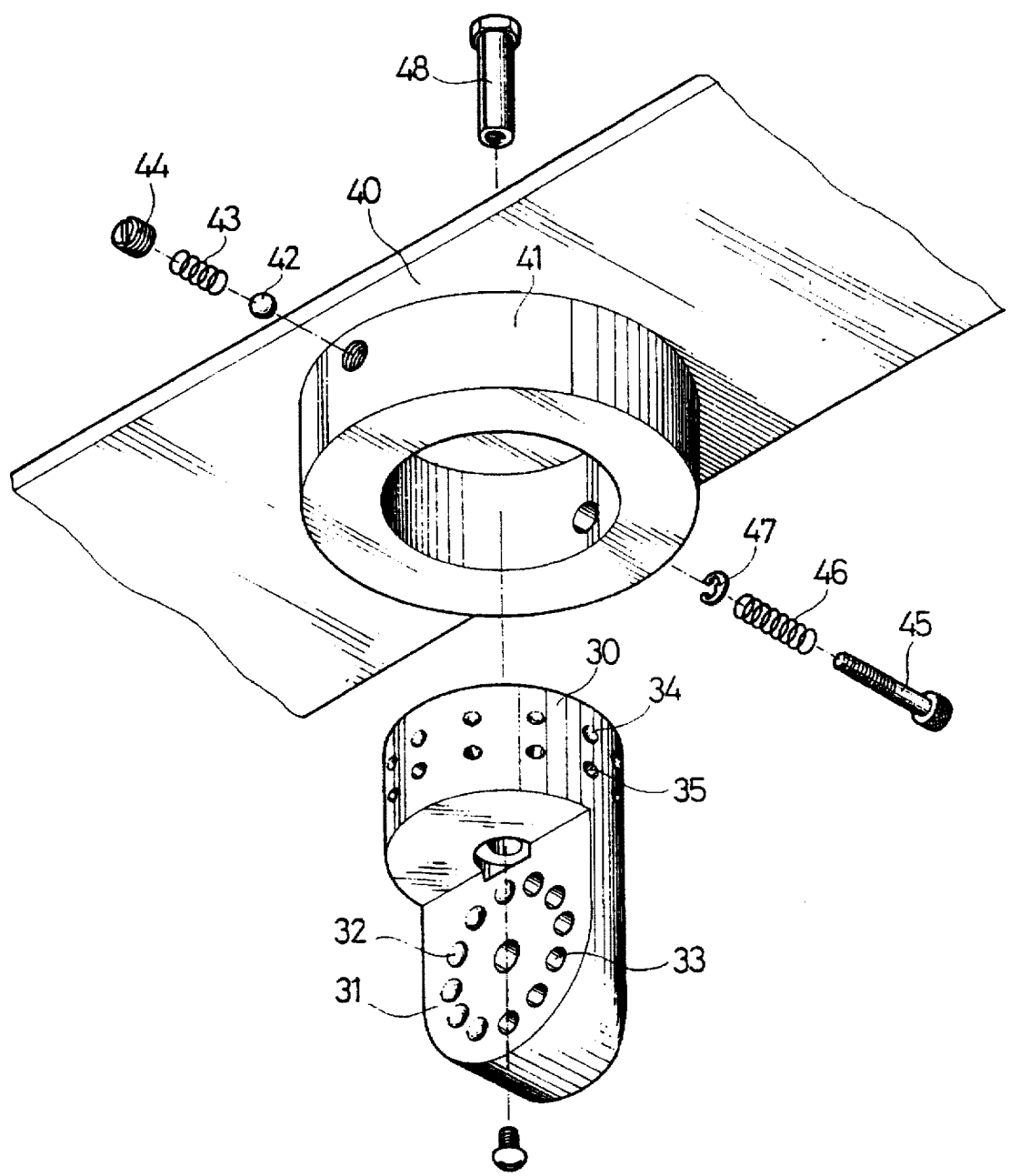
FIG. 4 is an exploded perspective view showing the rotating mechanism disposed between the spacing block and the top plate.
Figure 5:
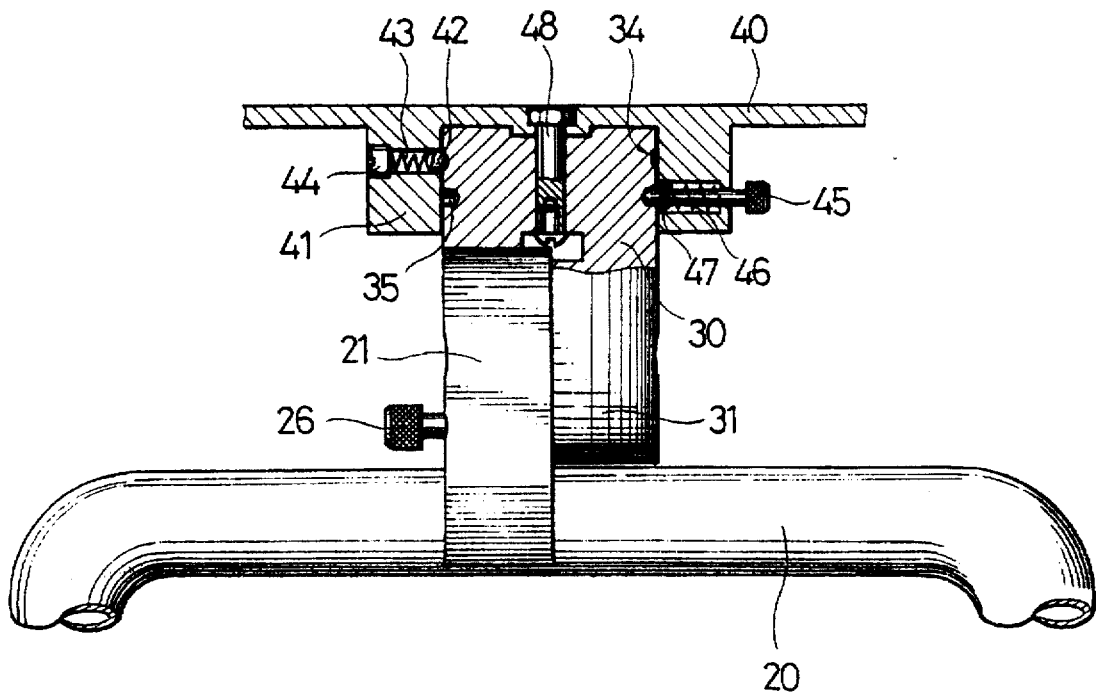
FIG. 5 is a cross sectional view of the rotating mechanism disposed between the spacing block and the top plate when assembled.

On the other hand, the rotation between the spacing block 30 and the top plate 40 is clearly shown in FIGS. 4 and 5. The spacing block 30 is rotably received within the shaft seat 41 by a post thereunder and a longitudinal shaft 48 is used to lock up each other. The top surface of the spacing block 30 is provided with a plurality of circular recesses 34 and retaining recesses 35 with respect to each other. The shaft seat 41 of the top plate 40 is provided with a through hole with respect to the circular recesses 34 and a steel ball 42, a spring 43, and a bolt 44 are installed within said through hole. By this arrangement, the steel ball 42 is projected into the circular recess 34. On the other hand, the shaft seat 41 is also provided with a through hole with respect to the retaining recess 35. This through hole is also installed with a latch 45 and a spring 46. A stopping plate 47 is fixed to the suitable position of the latch 45 and is biased by the spring 46, consequently, the tip of the latch 45 is projected into the retaining recess 35 to fix the desired position. The rear end of the latch 45 is projected above the shaft seat 41 for readily handling. When the latch 45 is released, the top plate 40 can rotate with respect to the spacing block 30 through 360 degrees. During the rotation/adjustment, the steel ball 42 is slipped within the circular recesses 34. When the desired position is reached, the latch 45 is also aligned with a corresponding retaining recess 35, then the latch 45 can be resumed to its locked position which is projected into the retaining recess 35 as the latch 45 is moved in again by the spring 46. As a result, the desired angle is attained.

Figure 6:
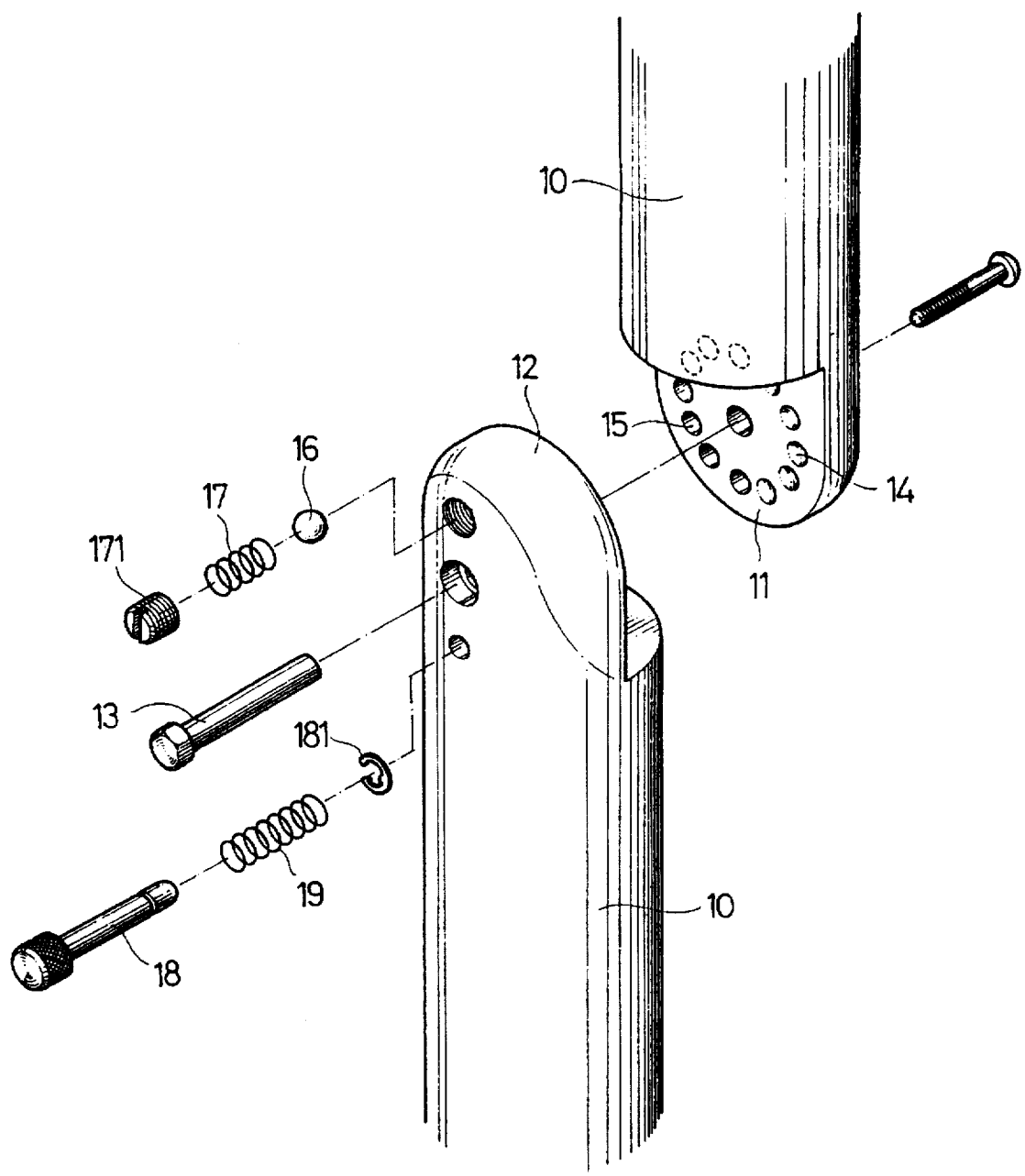
FIG. 6 is an exploded perspective view of the articulating means disposed at the main frame.
Figure 7:
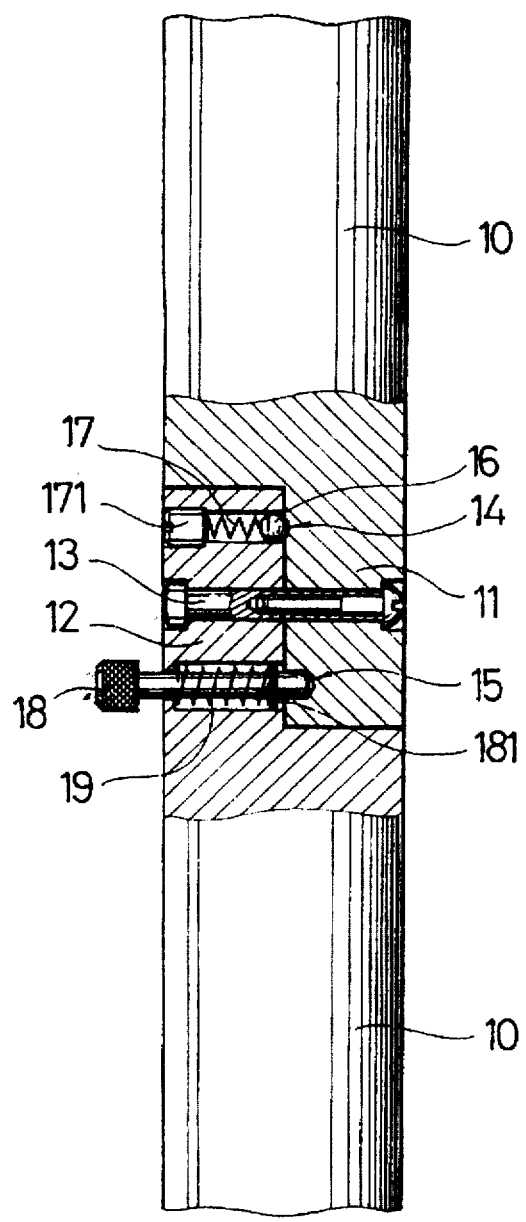
FIG. 7 is a cross sectional view of the articulating means disposed at the main frame.

Besides, the articulating means disposed at the main frame 10 is shown in FIGS. 6 and 7. As shown in FIG. 6, the upper and lower frame are provided with a pivoting seat 11, 12 respectively. Those two pivoting seats 11, 12 can be coupled and connected by a traverse shaft 13. The pivoting seat 11 of the upper frame is provided with a plurality of circular recesses 14 which range 180 degrees. The other 180 degrees sector is provided with a plurality of retaining recesses 15 with respect to those circular recesses 14. The pivoting seat 12 of the lower frame is provided with a through hole aligned with the first circular recess 12. The through hole is installed with latch 18 and a spring 19. The latch 18 is also installed with a stopping plate 181 which is biased by said spring 19. Consequently, the tip of the latch 18 is projected into a corresponding retaining recess 15, i.e. in a locked position. The rear end of the latch 18 is projected from the pivoting seat 12 for readily handling. The operation of this articulating means is similar to the articulating means disposed between the connecting bracket 20 and the spacing block 30. Firstly, the latch 18 is released from its locked position and the steel ball 16 may slip among the circular recesses 14. Consequently, the upper and lower frame can be adjusted within 180 degrees.

A backrest 50 can be disposed on the main frame 10. Normally, the backrest 50 is interconnected with the upper frame 11 and no engagement is made with the lower frame 12. By this arrangement, the backrest 50 can be adjusted to a desired position, the inclination of the backrest. On the other hand, the backrest 50 is provided with a chamber 51 for storing articles as mentioned above. A cover my be incorporated to enclose the chamber 51 according to the article incorporated therein. Besides, a pillow 60 is disposed at the top of the top plate 40. A chamber 61 can be provided at the rear side of the pillow 60 also.

The backrest assembly can be installed at from seat, including the pillow, of the vehicle to replace the original one. The lower end of the lower frame can be welded to the original articulating part of the seat. With this arrangement, the backrest assembly is a fixed type which means it is not removable.

Figures 8, 8A:
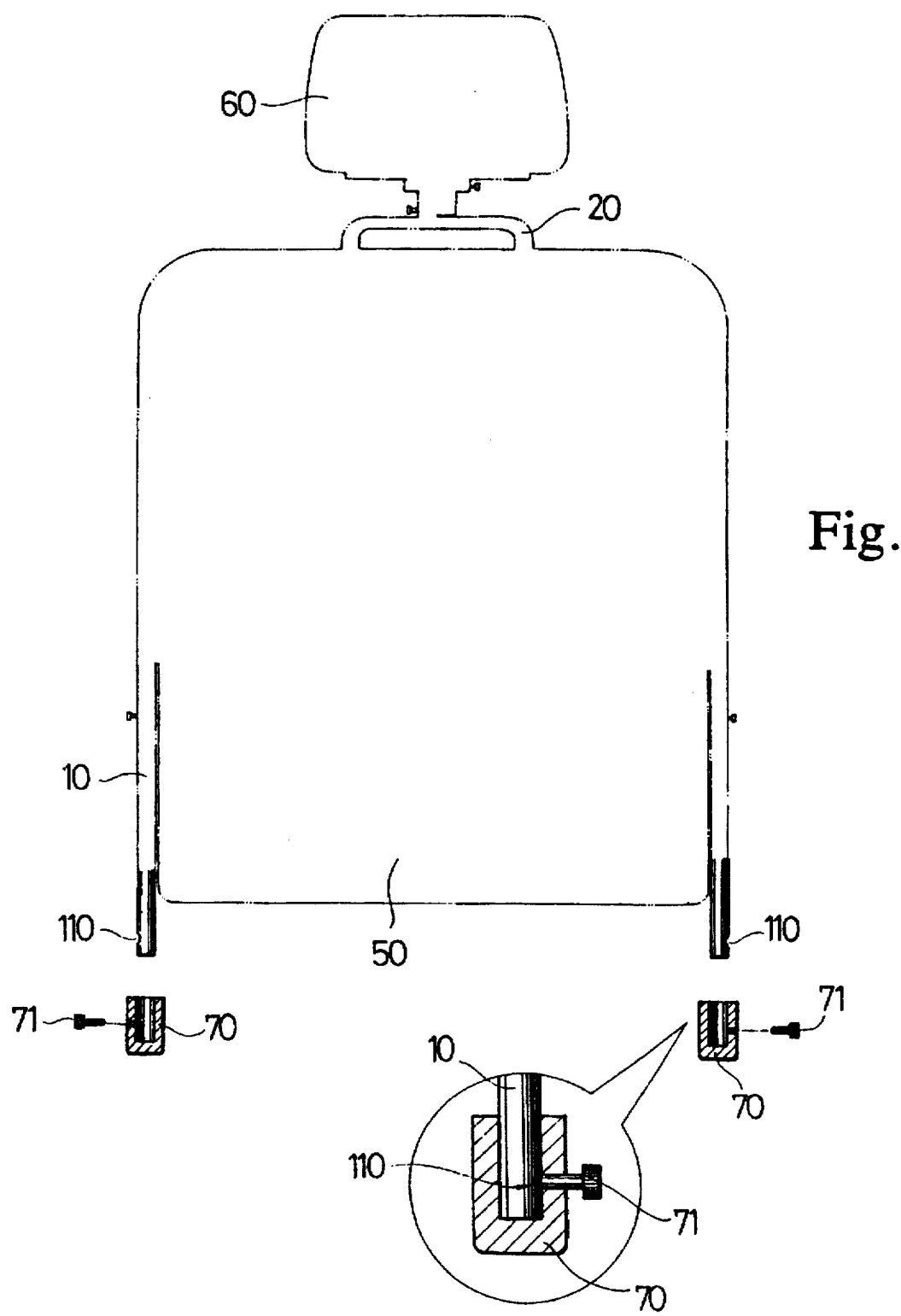
FIG. 8 and FIG. 8A are cross sectional and a detailed view, respectively, of the detachable connecting mechanism disposed at the lower end of the main frame.

On the other hand, as shown in FIG. 8, an alternative embodiment, the lower end of the main frame 10 is provided with a slot 110. Then a sleeve 70 with enclosed end is enveloped to the lower end of the main frame 10. The sleeve 70 is provided with a side hole which receives a bolt 71 thereof. In use, the sleeve 70 can be welded to the articulating portion of the seat firstly, then the lower ends of main frame 10 can be received within the sleeve 70 respectively and locked thereof by the bolt 71 provided thereof. With this arrangement, the backrest assembly can be readily installed when in use, while it may also be removed readily while not in use.

Figure 9:
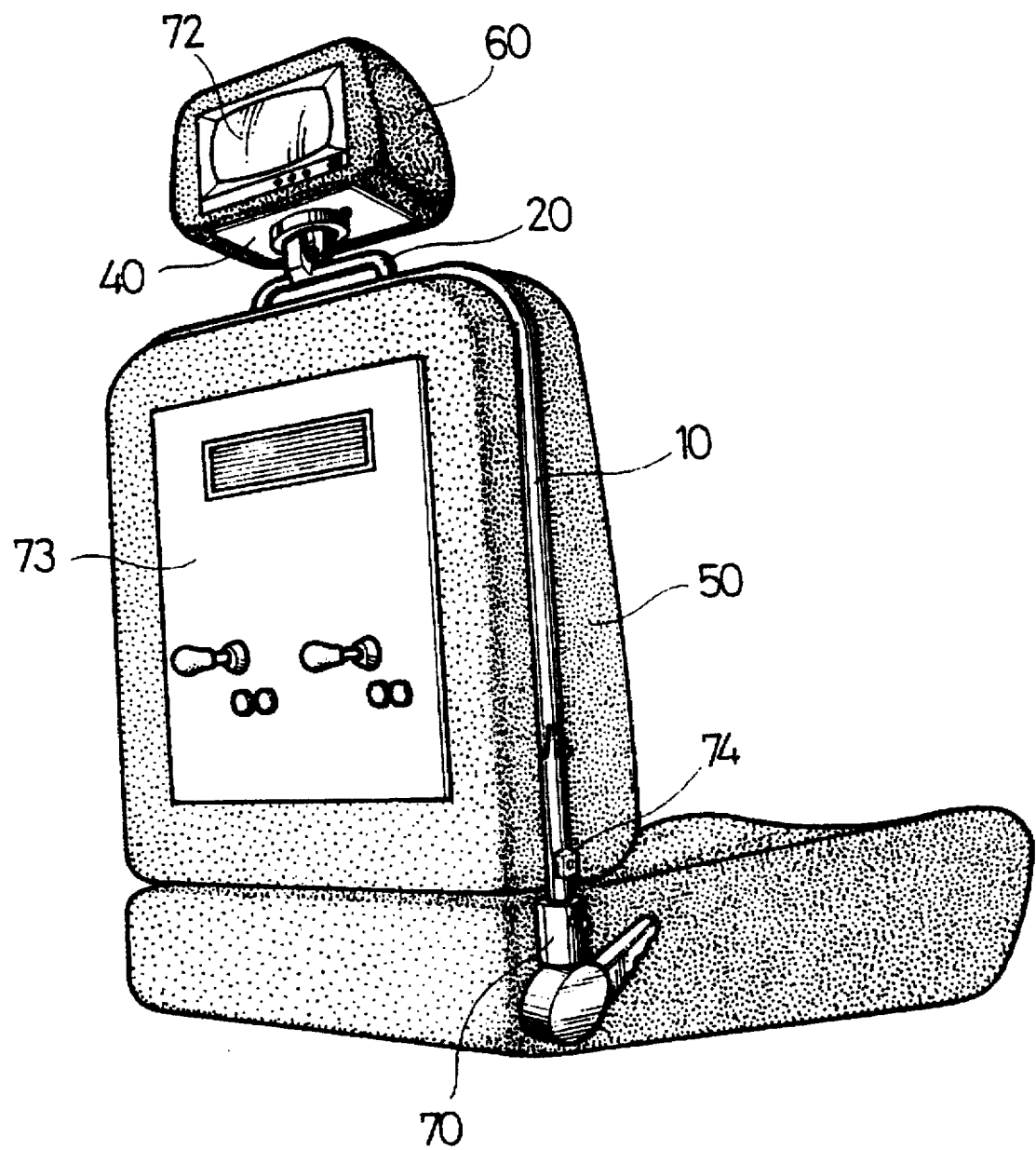
FIGS. 9 and 10 are the sketch view of the backrest in application.

A plurality of articles can be incorporated with the chambers, for example, a TV set can be disposed with the chamber 61 of the pillow 60 and the above mentioned articles, such as the video set, game set, karaoke, can be installed within the chamber 51 of the backrest 50. Of course, the chamber 51 can be partitioned directly for storing. As shown in FIG. 9, a preferable embodiment according to the present invention, a TV set 72 is installed at the pillow 60 and a game set 73 is installed at the backrest 50. The TV set can receive the shows or program directly from the TV stations in one hand, and can be also served as a monitor for the game set 73. When the electronic equipment is installed, a connector or socket 74 is disposed at side of the main frame 10. The connector or socket 74 can be powered from the socket of the lighter.

Figure 10:
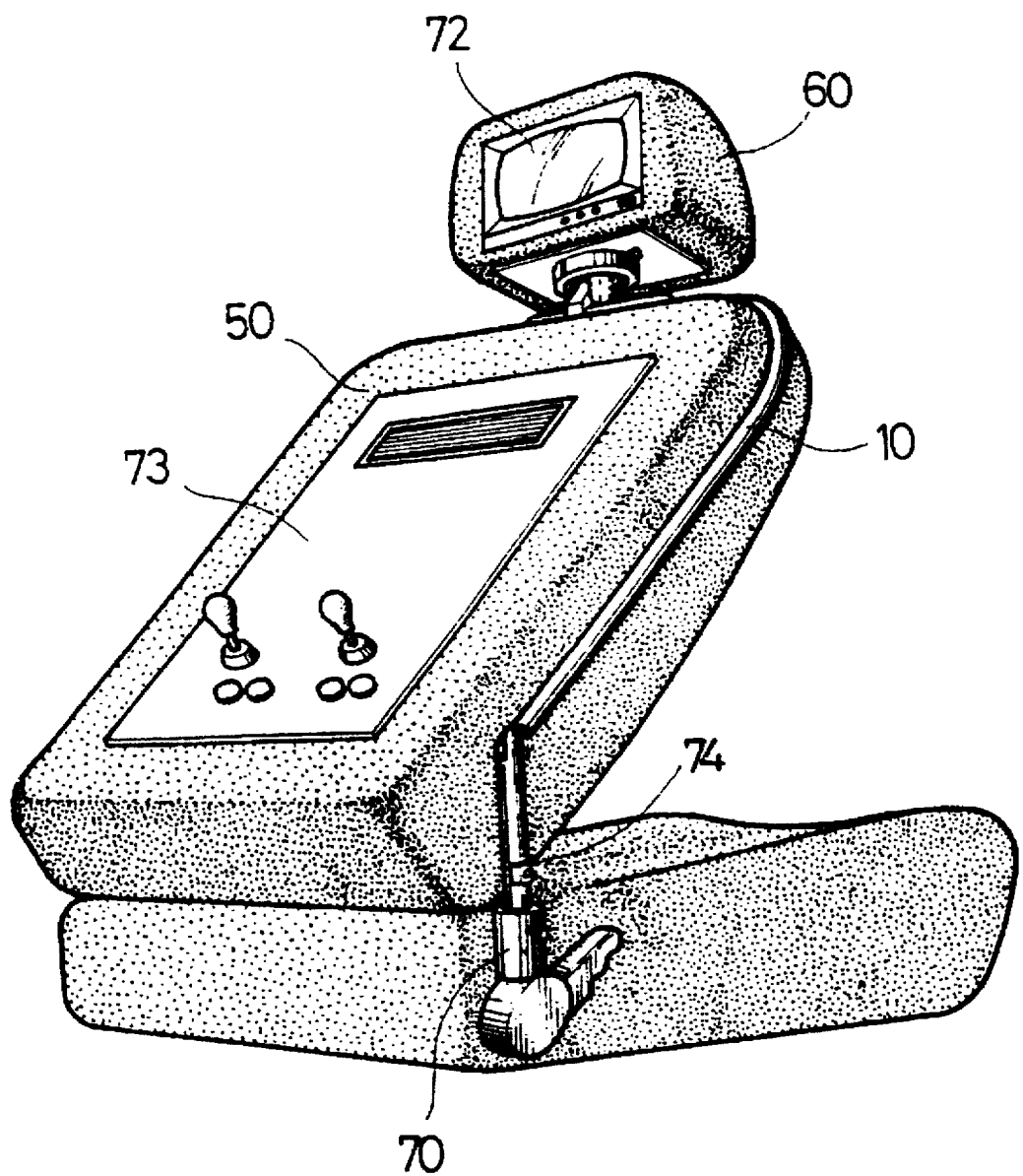

In order to get a desired relative position for the equipment, the articulating means of the main frame 10, the articulating means between the connecting bracket 20 and spacing block 30 and the spacing block 30 and the top plate 40 can be readily adjusted to get a desired position for manipulating or enjoy the entertainment. As shown in FIG. 10, the backrest 50 for the game set 73, and the pillow 60 for the TV set 72 can be suitably adjusted for readily manipulating. While the equipment is not in use, the backrest 50 and the pillow 60 can be readily resumed to its original position. In case the backrest assembly is removable, the backrest assembly can be unplugged and bring back to home.

Figures 11, 11A:
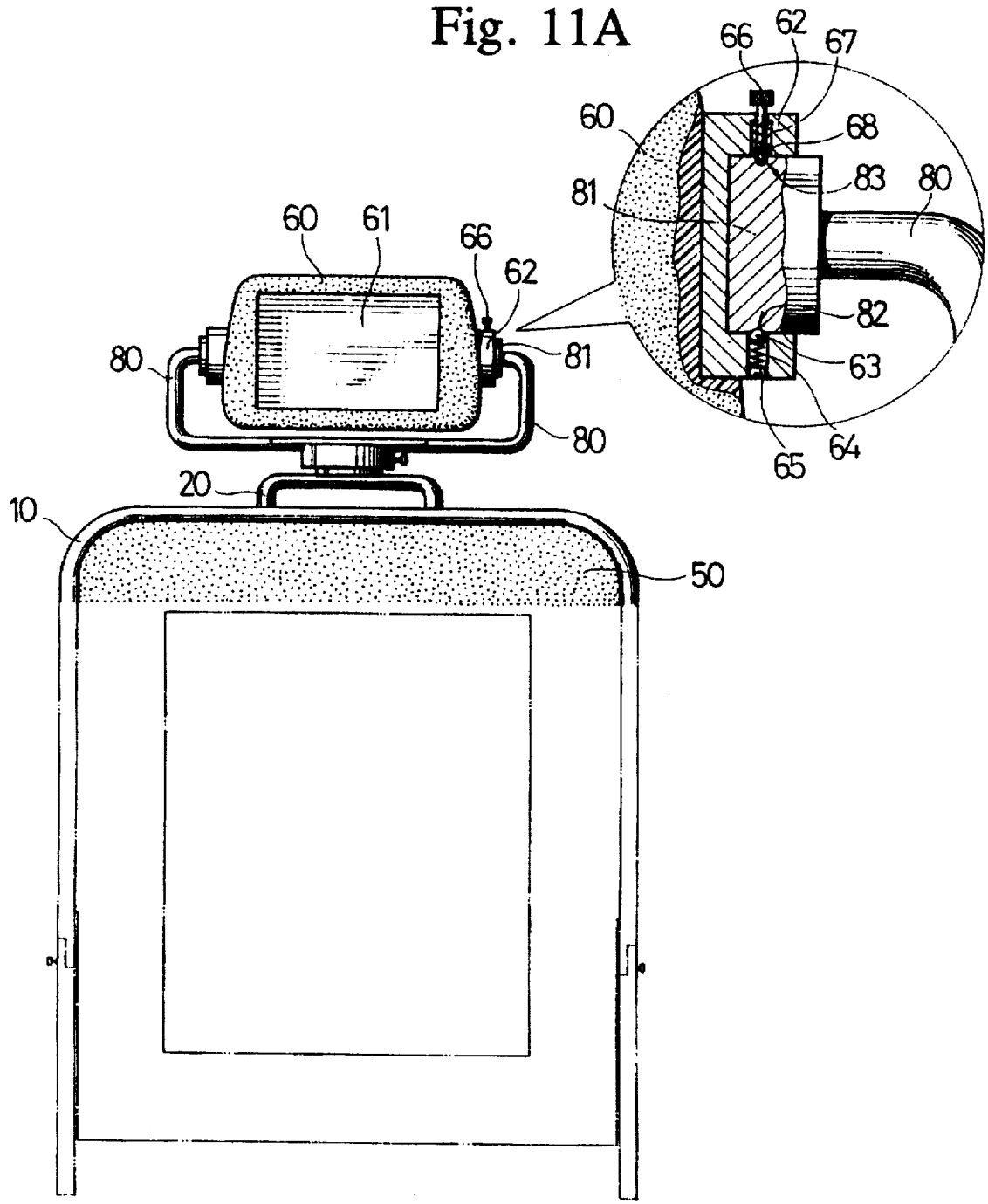
FIG. 11 and FIG. 11A are an alternative embodiment of the articulating device made according to this invention.

In another alternative, the articulating means of the pillow 60 can be embodied as shown in FIG. 11 and FIG. 11A. The connecting mechanism applied between the spacing block 30 and the top plate 40 can be applied to the connection between the connecting bracket 20 and the top plate 40. Since this connection has detailedly disclosed already and no further description is given. The top plate 40 is provided with a supporting bracket 80 having a shaft 81 and which is rotably received within the shaft seat 62 disposed at sides of the pillow 60 respectively. The top surface of the shaft 81 is provided with a plurality of circular recesses 82 and retaining recesses 83 with respect to each other. The shaft seat 62 of the pillow 60 is provided with a through hole with respect to the circular recesses 82 and a steel ball 63, a spring 64, and a bolt 65 are installed within said through hole. By this arrangement, the steel ball 63 is projected into the circular recess 82. On the other hand, a through hole with respect to the retaining recess 83 is also provided. This through hole is also installed with a latch 66 and a spring 67. A stopping plate 68 is fixed to the suitable position of the latch 66 and is biased by the spring 67, consequently, the tip of the latch 66 is projected into the retaining recess 83 to fix the desired position. The rear end of the latch 66 is projected above the shaft seat 62 for readily handling. By this provision, the pillow 60 can be adjusted to the designed position both in horizontal and vertical directions.

Even in this preferable embodiment, the articulating mechanism and the rotating mechanism use the steel ball and circular recess arrangement, it is appreciated to the skilled in the art that other alternative can be applied such as the elongate slot and rib arrangement.

The present invention can be concluded with the following advantages.

1. Since there is an articulating means disposed on the main frame 10, between the connecting bracket 20 and the spacing block 30, and the spacing block 30 and the top plate 40, accordingly, a desired position can be readily achieved by the adjustment between those elements. The passenger can readily find a suitable position for enjoyment of the TV shows or games.

2. Those equipment can be readily incorporated without occupying the extra space inside the vehicle, for example, the TV can be readily installed into the pillow 60 and the video set, game set and the karaoke can be incorporated within the backrest or even make partitions to store other articles. The backrest assembly is particularly suitable for the business car, i.e. the taxi, so the passenger can feel at home. No doubt, this will be a good sales and the income will increase accordingly. If the private car install this backrest assembly, the passengers sit on the rear seat can enjoy the entertainment, i.e. the TV show, game or video tape or even singing with the karaoke, provided by the equipment installed. No doubt, this is specially suitable for the family especially in the long-distance travel or in a traffic jam.

3. Since the equipment, such as the TV set and the video set are disposed at rear side of the backrest, the driver will not be influenced even the passengers are enjoyed it. The safety can be ensured.

4. The backrest can be configured as removable, accordingly, the risk of been stolen can be largely reduced as the driver can bring back its favorite.

It will be understood that the invention is not limited to all the specific details described in connection with the preferred embodiments, except as they may be within the scope of the appended claim, and that changes to certain features of the preferred embodiment which do not alter the overall basic function and concept of the invention are contemplated.

I claim:

1. A backrest assembly, comprising:

a U-shaped frame assembly having an upper frame portion and a lower frame portion;

first adjusting means for adjustably connecting said upper frame portion with said lower frame portion;

a backrest joined with said U-shaped frame assembly, said backrest defining a chamber for storing articles;

a connecting bracket fixed to a top portion of said upper frame portion of said U-shaped frame assembly;

a spacing block;

second adjusting means for adjustably connecting said spacing block with said connecting bracket;

a top plate; and third adjusting means for adjustably connecting said top plate with said spacing block; and a pillow member supported by said top plate, a side of said pillow defining a chamber, wherein said first adjusting means comprises a first pivot seat provided on said lower frame portion and a second pivot seat provided on said upper frame portion, a transverse shaft being received in a shaft opening defined in each of said first and said second pivot seats and securing said first and said second pivot seats in rotational engagement, one of said first and second pivot seats having a first ball opening defined therein and an opposing one of said first and said second pivot seats having a first plurality of circular recesses defined therein, one of said first and second pivot seats having a first latch opening defined therein and an opposing one of said first and second pivot seats having a first plurality of retaining recesses defined therein, said first ball opening receiving a first bolt and a first ball spring therein, said first ball spring biasing a first ball spring therein, said first ball spring biasing a first ball into one of said first plurality of circular recesses, said first latch opening receiving a first latch, a first latch spring and a first latch stopping plate therein, and said first latch spring biasing an end of said first latch into one of said first plurality of retaining recesses such that relative rotational movement between said first and second pivot seats is adjustably prevented.

2. The backrest assembly as defined by claim 1, wherein:

said second adjusting means comprises a third pivot seat provided on said connecting bracket and a fourth pivot seat provided on said spacing block, a transverse shaft being received in a shaft opening defined in each of said third and fourth pivot seats and securing said third and fourth pivot seats in rotational engagement, one of said third and fourth pivot seats having a second ball opening defined therein and an opposing one of said third and fourth pivot seats having a second plurality of circular recesses defined therein, one of said third and fourth pivot seats having a second latch opening defined therein and an opposing one of said third and fourth pivot seats having a second plurality of retaining recesses defined therein, said second ball opening receiving a second bolt and a second ball spring therein, said second ball spring biasing a second ball into one of said second plurality of circular recesses, said second latch opening receiving a second latch, a second latch spring and a second latch stopping plate therein, and said second latch spring biasing an end of said second latch into one of said second plurality of retaining recesses such that relative rotational movement between said third and said fourth pivot seats is adjustably prevented.

3. A backrest assembly as defined by claim 2, wherein:

said third adjusting means comprises a shaft seat connected with said top plate and rotatably engaged with a shaft provided on said spacing block, one of said shaft seat and said shaft on said spacing block having a third ball opening defined therein and an opposite one of said shaft seat and said shaft on said spacing block having a third plurality of circular recesses defined therein, one of said shaft seat and said shaft on said spacing block having a third latch opening defined therein and an opposite one of said shaft seat and said shaft on said spacing block having a third plurality of retaining recesses defined therein, said third ball opening receiving a third bolt and a third ball spring therein, said third ball spring biasing a third ball into one of said third plurality of circular recesses, said third latch opening receiving a third latch, a third latch spring and a third latch stopping plate therein, and said latch spring biasing an end of said latch into one of said third plurality of retaining recesses such that relative rotational movement between said shaft and said shaft seat is adjustably prevented.

4. A backrest assembly as defined by claim 1, wherein said lower frame portion of said U-shape main frame is inserted into a sleeve having an enclosed end, said sleeve being provided with a side hole which receives a bolt to be received in a slot in the lower frame portion of said U-shaped main frame.

* * * * *